United States Patent [19]

Takayama

[11] Patent Number: 4,628,378
[45] Date of Patent: Dec. 9, 1986

[54] INFORMATION SIGNAL RECORDING AND/OR REPRODUCING APPARATUS

[75] Inventor: Nobutoshi Takayama, Kanagawa, Japan

[73] Assignee: Canon Kabushiki Kaisha, Tokyo, Japan

[21] Appl. No.: 643,806

[22] Filed: Aug. 23, 1984

[30] Foreign Application Priority Data

Aug. 26, 1983 [JP] Japan ................................. 58-156688
Sep. 9, 1983 [JP] Japan ................................. 58-167071

[51] Int. Cl.[4] ........................................... G11B 21/02
[52] U.S. Cl. .................................... 360/77; 360/10.2; 360/75
[58] Field of Search ........................... 360/75, 77, 10.2

[56] References Cited

U.S. PATENT DOCUMENTS

| 4,223,358 | 9/1980 | Kubota et al. | 360/75 |
| 4,233,637 | 11/1980 | Kubota | 360/10 |
| 4,255,771 | 3/1981 | Kubota | 360/77 |
| 4,309,730 | 1/1982 | Sanderson | 360/77 |
| 4,356,522 | 10/1982 | Takano et al. | 360/77 |
| 4,366,515 | 12/1982 | Takano et al. | 360/77 |
| 4,395,741 | 7/1983 | Kobayashi et al. | 360/77 |
| 4,410,918 | 10/1983 | Watanabe | 360/77 |
| 4,451,859 | 5/1984 | Noel | 360/75 |
| 4,513,334 | 4/1985 | Otsuka | 360/75 |

FOREIGN PATENT DOCUMENTS

| 54-73616 | 6/1979 | Japan | 360/75 |
| 55-122230 | 9/1980 | Japan | 360/75 |
| 58-139329 | 8/1983 | Japan | 360/77 |

Primary Examiner—George G. Stellar
Attorney, Agent, or Firm—Toren, McGeady, Stanger, Goldberg & Kiel

[57] ABSTRACT

The disclosed information signal recording and/or reproducing apparatus records or reproduces an information signal by shifting two electric-to-mechanical conversion elements which respectively have heads mounted thereon. Each electric-to-mechanical conversion element has a residual displacement characteristic. The shift direction of one conversion element is arranged to be the same as that of the other immediately before switchover from a first mode to a second mode. In the first mode, the difference between voltages impressed on the two elements is relatively large, and, in the second mode, the difference between voltages impressed on the two elements is relatively small.

16 Claims, 18 Drawing Figures

INFORMATION SIGNAL RECORDING AND/OR REPRODUCING APPARATUS

BACKGROUND OF THE INVENTION

1. Field of the Invention

This invention relates to an information recording and/or reproducing apparatus and more particularly to an apparatus for recording and/or reproducing information signals with a pair of heads respectively shifter by a pair of shifting elements having residual displacement characteristics.

2. Description of the Prior Art

It is recent conventional practice in the field of magnetic recording to have magnetic recording or reproducing heads mounted on electric-to-mechanical conversion elements. The heads are made to record or reproduce a signal at desired points on a recording-bearing medium by driving electric-to-mechanical conversion elements so they shift the positions of the magnetic heads. Electric-to-mechanical conversion elements usable for this purpose include, for example, a bimorph-type piezo-electric ceramic element (hereinafter called a bimorph element). An element of this kind generally has a residual displacement characteristic.

FIG. 1 of the accompanying drawings shows the voltage impressed on a bimorph element and the displacement characteristic of the element in relation to the impressed voltage. As shown, even when a voltage which is the same as previously-impressed voltage is impressed on the bimorph element, the displacement of the element is different from the previous displacement due to the previous characteristic movement of the element. Such a residual displacement characteristic has caused problems in magnetic recording and/or reproducing apparatuses with an electric-to-mechanical conversion element such as a bimorph element.

FIGS. 2A–2C show th problems of these conventional apparatuses. In FIG. 2A, the apparatus includes a base plate 1, on which bimorph elements 2 and 3 are mounted, and magnetic heads 4 and 5 mounted on the bimorph elements 2 and 3. Displacement of the bimorph elements 2 and 3 shifts the magnetic heads 4 and 5 in the directions of arrows 6 and 7, respectively. Where the displacements of the bimorph elements 2 and 3 are equal to each other, heads 4 and 5 are in alignment with each other in the direction of arrow 11, which is perpendicular to the direction of displacement of the bimorph elements 2 and 3. For an apparatus arranged in this manner, let us assume that the magnetic heads 4 and 5 are repsectively shifted to an extent la by impressing voltages of opposite directions on the bimorph elements 2 and 3. The condition schematically shown in FIG. 2B results. In FIG. 2B, reference numerals 8 and 9 denote the tracing loci of heads 4 and 5 obtained when the record bearing medium is moved in the direction of arrow 11 under the above condition. In other words, recording tracks represented by the loci 8 and 9 are obtained if a recording operation is performed under the above condition. Where the same track is to be traced by both of the two heads, the position of either the base plate 1 or the record bearing medium need be adjusted in the direction of arrow 12, with the displacements of the bimorph elements arranged to be equal to each other. However, even when the voltage impressed on the two bimorph elements 2 and 3 in the condition of FIG. 2B are changed to zero, the displacement characteristic shown in FIG. 1 prevents these elements from coming back to their initial positions and causes element 2 to be shifted from a point A to a point A′ and the other element 3 to be shifted from a point B to a point B′. The residual displacement characteristic thus causes the respective bimorph elements to deviate as much as lb in opposite directions from their initial positions, which are on a straight line 10 of FIG. 2B. FIG. 2C shows this deviation.

To remove the adverse effect of the above-stated residual displacement characteristic, attempts have been made to bring the position of the bimorph element to point 0 shown in FIG. 1 by applying an alternating voltage which gradually attenuates. However, this method necessitates provision of a gradually attenuating voltage and results in a complex circuit arrangement. Besides, this method takes an excessively long period of time to remove the adverse effect of the residual displacement characteristic. More specifically, a given length of time is necessary for equalizing the displacements of the two bimorph elements from the condition shown in FIG. 2B. This method is hardly effective for instantly equalizing the extents of displacement of the bimorph elements or those of the heads.

The residual displacement characteristic also presents problems in a magnetic video tape recording and/or reproducing apparatus of the rotating two-head helical scanning type (hereinafter called VTR). FIGS. 3A–3C show the problem caused a conventional VTR by the residual displacement characteristic of the electric-to-mechanical elements. FIG. 3A shows the structural arrangement of a rotary head drum of a VTR. The VTR is provided with a rotary drum 21; bimorph elements 22 and 23; and heads 24 and 25 mounted on the bimorph elements 22 and 23. Arrows 26 and 27 indicate the directions of shift of the heads 24 and 25. The heads 24 and 25 are arranged to rotate on the same plane if the extents of displacement of the bimorph elements 22 and 23 are equal. Further, the heads 24 and 25 have the same magnetization direction.

In FIG. 3B, arrow 33 indicates the travel direction of a magnetic tape 28. In normal recording, tape 28 travels at a predetermined speed in the direction of arrow 33. Recording tracks are formed on the tape 28 one after another by causing magnetic heads 24 and 25 to trace the tape. The center lines of the recording tracks are indicated by full lines 29. When the tape is brought to a stop, the direction of the tracing loci of the heads 24 and 25 is as shown by a one-dot-chain line 30. When reproducing at a tape speed four times as fast as the normal recording tape speed, the direction of the tracing loci of the heads 24 and 25 becomes that shown by a twodot-chain line 31.

During so-called high speed search or still picture reproduction carried out at a tape travel speed different from normal reproduction speed, a noiseless reproduced picture is obtained with the heads shifted in the direction of arrow 32 by controlling the bimorph elements. FIG. 3C is a timing chart showing the timing of impression voltages impressed on the bimorph elements 22 and 23 during a four-times increased-speed searching reproduction. In FIG. 3C, wave form (a) represents a signal related to the rotation of the drum 21. The magnetic tape is traced by the head 24 while this signal is at a low level, i.e., during periods indicated by reference symbol A in FIG. 3C, and is traced by another head 25 while this signal is at a high level, i.e., during periods indicated by symbol B. Further, in FIG. 3C, wave form (b) represents a voltage to be impressed on the bimorph element 22 for shifting the head 24; and a wave form (c) a voltage to be impressed on the other bimorph element 23 for shifting the other head 25. In these wave forms (b) and (c), downslope parts on the right-hand side represent voltage portions controlling the heads 24 and 25 while they are tracing the magnetic tape 28.

When an instruction is given at a time t1 of FIG. 3C, to bring the four-times increased speed search back to normal reproduction, for example, the extents of displacement of the bimorph elements 22 and 23 should be adjusted to equal each other to equalize the positions of the heads 24 and 25 in the directions of arrows 26 and 27 (hereinafter called the head height). In such an instance, however, if the two impressed voltages are adjusted to zero at ensuing zero points or at the point in time t1, the bimorph element 22 changes its position from the point A to another point A' and element 23 from the point B to another point B', as shown in FIG. 1. This hinders adjustment of the head height and results in the deviation 2lb as shown in FIG. 1. The conventional method for preventing this deviation by using an alternating attenuation signal as the impression voltage not only results in a complex circuit arrangement but also takes an excessively long period of time to remove the adverse effect of the residual displacement characteristic in question. In other words, bringing the two bimorph elements from the points A and B in FIG. 1 to the point 0 of FIG. 1 by the conventional method, requires a certain length of time. It has thus been impossible to instantaneously equalize the extents of displacement of the bimorph elements, i.e., the shifting extents of the heads. For example, in the case of FIG. 2A, the heads remain entirely useless while the operating mode of the apparatus is switched over from high speed searching reproduction to normal reproduction. Therefore, in that instance, no satisfactory reproduced picture is obtained.

SUMMARY OF THE INVENTION

The present invention is directed to the elimination of the above-stated shortcomings of the prior art apparatus. It is therefore a principal object of the invention to remove the adverse effect of the residual displacement characteristic of shifting elements on which a pair of heads are mounted.

It is another object of the invention to provide an information signal recording and/or reproducing apparatus for perfectly adjusting the relative positions of a pair of heads in the event of switch-over from one operation mode to another.

It is a further object of the invention to provide an information signal recording and/or reproducing apparatus for instantaneously equalizing the extents of displacement of a pair of shifting elements having residual displacement characteristics.

It is still further object of the invention to provide a video tape recorder for recording and/or reproducing an information signal in a satisfactory manner even after tape travel speed is switched over from one speed to another.

To achieve these objects, an information signal recording and/or reproducing apparatus arranged according to this invention, as a preferred embodiment thereof, includes a pair of heads for recording and/or reproducing an information signal; a pair of shifting elements which have the pair of heads mounted thereon and are arranged to shift these heads respectively; a first driving component arranged to generate first and second driving signals for driving the pair of shifting elements, respectively, when the apparatus is in a first mode; and a second driving component arrange to generate third and fourth driving signals for driving the pair of shifting elements, respectively, when the apparatus is in a second mode. The maximum value of the level difference between the third and fourth driving signals at the same point in time is arranged to be smaller than that of the level difference between the first and second driving signals at the same point in time; the apparatus further includes a mode selection element for switch-over between the first and second modes and a driving control component for driving the shifting element to the same extent in the same direction in response to the operation of the mode selection element to effect switch-over from the first mode to the second mode.

These and further objects and features of the invention will become apparent from the following detailed description of embodiments thereof taken in connection with the accompanying drawings.

DETAILED DESCRIPTION OF THE PREFERRED EMBODIMENTS

Figure 2A:
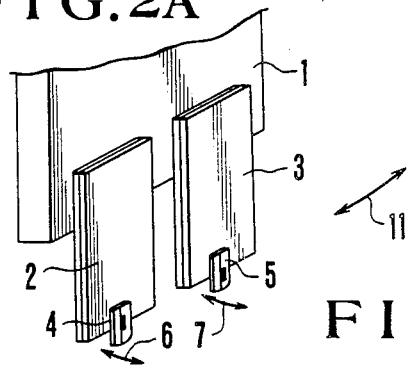
FIGS. 2A–2C are illustrations showing a problem presented by the conventional apparatus.
Figure 2B:
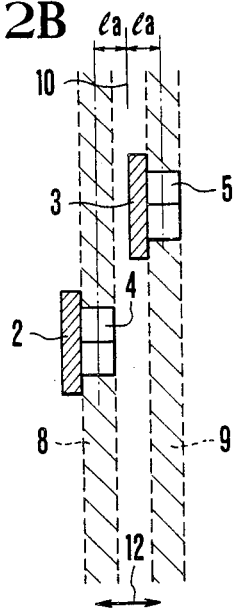
Figure 2C:
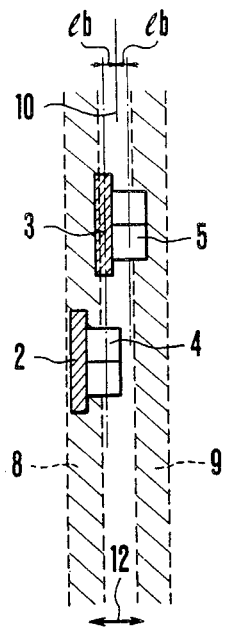
Figure 4:
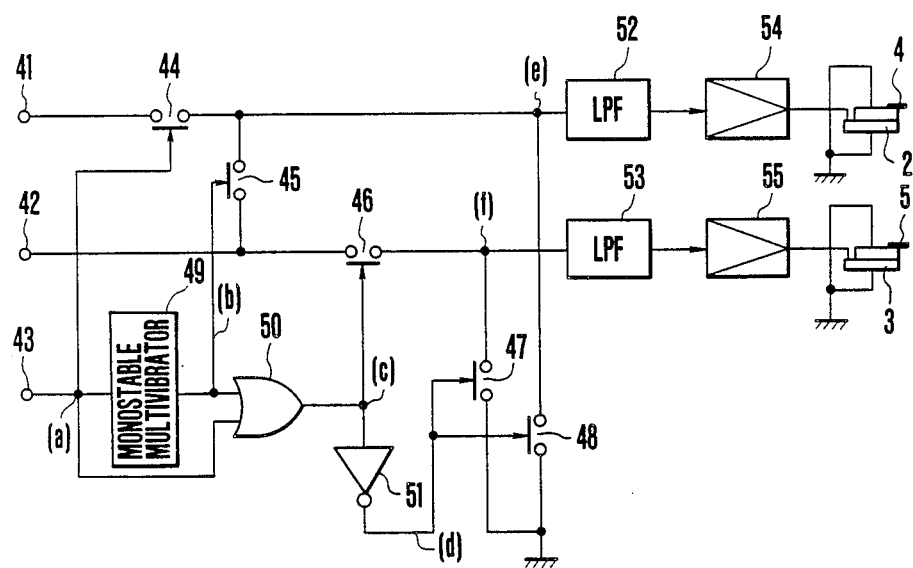
FIG. 4 is a circuit diagram showing the circuit arrangement of a bimorph element control system employed in a recording and/or reproducing apparatus arranged as an embodiment of this invention.
Figure 5:
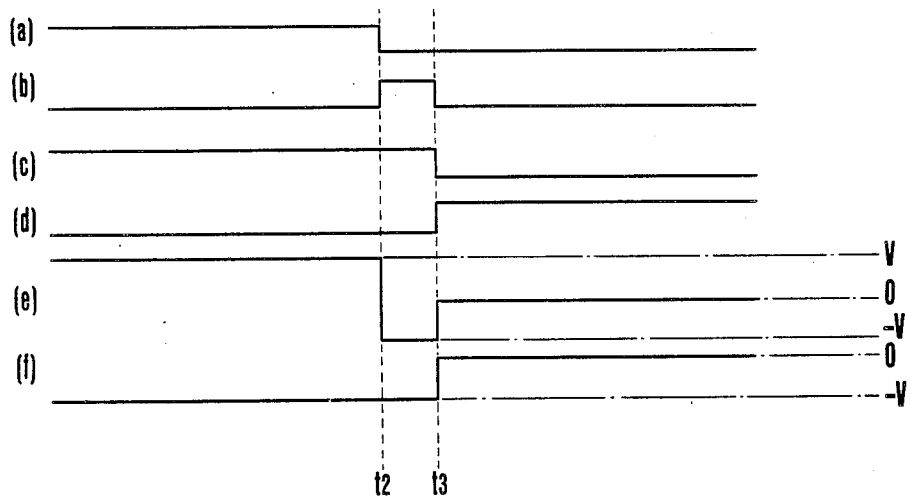
FIG. 5 consisting of (a)–(f) is a timing chart showing the output wave forms of various parts of FIG. 4.

The following is a detailed description of embodiments of the present invention. FIG. 4 shows the circuit arrangement of a bimorph element control system employed in a recording and/or reproducing apparatus arranged as an embodiment of the invention. FIG. 5 is a timing chart showing the wave forms at points (a)-(f) of FIG. 4. The apparatus of FIG. 4 is assumed to have recording or reproducing circuits arranged separately from the circuit arrangement shown in FIG. 4. FIG. 4 includes bimorph elements 2 and 3 arranged as shown in FIG. 2A; magnetic heads 4 and 5 also arranged as shown in FIG. 2A; a terminal 41 arranged to receive a constant voltage +V [V]; a terminal 42 arranged to receive a constant voltage −V [V]; a terminal 43 arranged to receive an instruction signal from a mode selector (not shown); analog switches 44, 45, 46, 47 and 48 arranged to be turned on and off by the inputs of control terminals indicated by arrows, respectively; a monostable multivibrator 49; an OR gate 50; an inverter 51; low-pass filters 52 and 53 (hereinafter a low-pass filter will be called LPF); and amplifiers 54 and 55.

The instruction signal supplied to the terminal 43 is arranged to be switched over between a high level and a low level. With the instruction signal at the high level, it instructs for a mode of recording or reproduction in which the heads 4 and 5 are to be shifted to an extent of $2la$ in the direction of arrow 12 (hereinafter called the first mode). When the instruction signal is at the low level, it instructs for another mode of recording or reproduction in which the heads 4 and 5 are to be aligned in a straight line in the direction of arrow 11 (hereinafter called the second mode).

When the instruction signal changes from the high level to the low level during the process of recording or reproducing in the first mode, the embodiment operates as follows: The switch 44 turns off at this instant (or a point of time t2). The output in the monostable multivibrator 49 arranged to trigger by the fall of its input signal. This causes the switch 45 to turn on. Therefore, the potential at point (e) supplied to the LPF 52 changes from +V [V] to −V [V]. The outut level of the monostable multivibrator 49 becomes low after it has remained high for a predetermined period of time. The switch 45 then turns off. The output level of the OR gate 50 becomes low. The switch 46 turns off. Meanwhile, since the output level of the inverter 51 then changes to a high level, switches 47 and 48 turn on and points (e) and (f) are grounded. Accordingly, the potentials at points (e) and (f) change as shown in FIG. 5. These potentials come via the LPF's 52 and 53 to be amplified by the amplifiers 54 and 55 and are then supplied to the bimorph elements 2 and 3.

Figure 1:
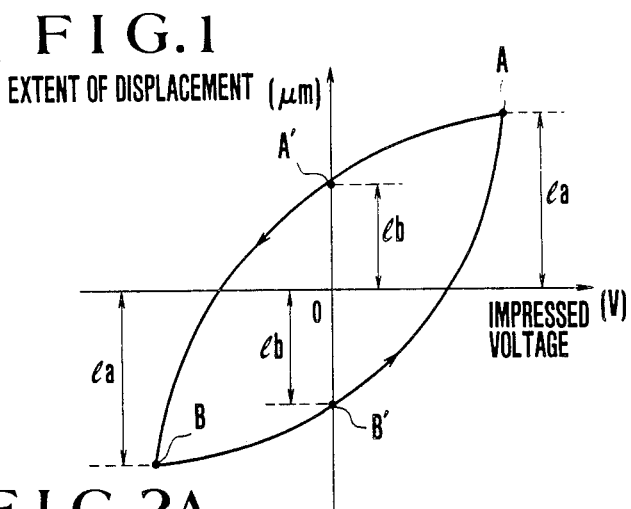
FIG. 1 is a graph showing the characteristic of extents of displacement of bimorph elements in relation to voltages impressed thereon.

In accordance with the arrangement described, the voltages impressed on the bimorph elements 2 and 3 are a predetermined potential (O V) from the same direction (or the negative side). Therefore, the extents of displacement of the bimorph elements 2 and 3 are approximately equal to each other. The positions of the heads 4 and 5 also come to coincide with each other in the direction of arrow 12. This will be further described with reference to FIG. 1. Assuming that the impressed voltage at a point A is +a1 V [V], the impressed voltage at a point B is −a2 V [V] and the gains of the amplifiers 54 and 55 are a1 to a2 respectively, the bimorph element 2 changes in a manner represented by A→B→B′ while the bimorph element 3 changes as represented by B→B′. Therefore, when the impressed voltages are shifted to 0 [V], the displacement extents of the bimorph elements 2 and 3 both become lb in the negative direction. In this specific embodiment, the voltage at point (f) is arranged to be shifted from −V [V] to 0 [V] at a time t3. However, this time may be changed from t3 to another time t2. In the latter case, the head 5 can be shifted to the second mode earlier than the head 4. Further, the same advantageous effect is attainable by changing the potential at point (e) in a manner by +V→0 and that of the part (f) as represented by −V→+V→0.

Figure 3A:
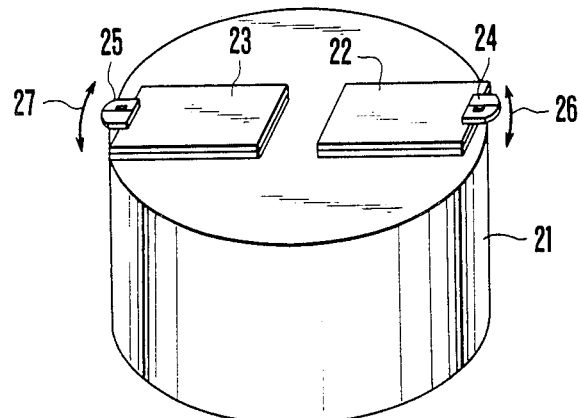
FIGS. 3A–3C are illustrations showing a problem caused by an electric-to-mechanical element employed in the conventional VTR.
Figure 3B:
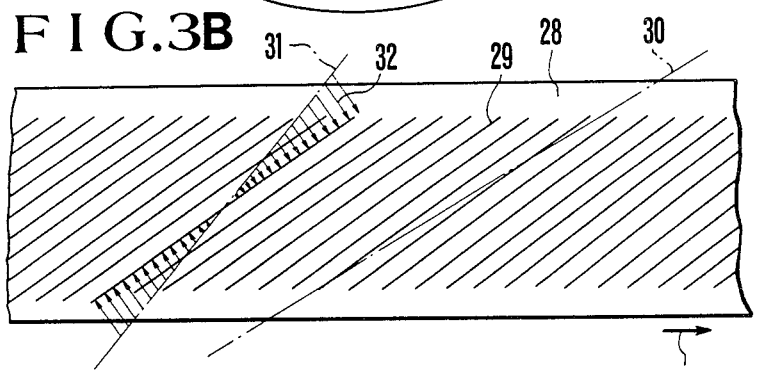
Figure 3C:
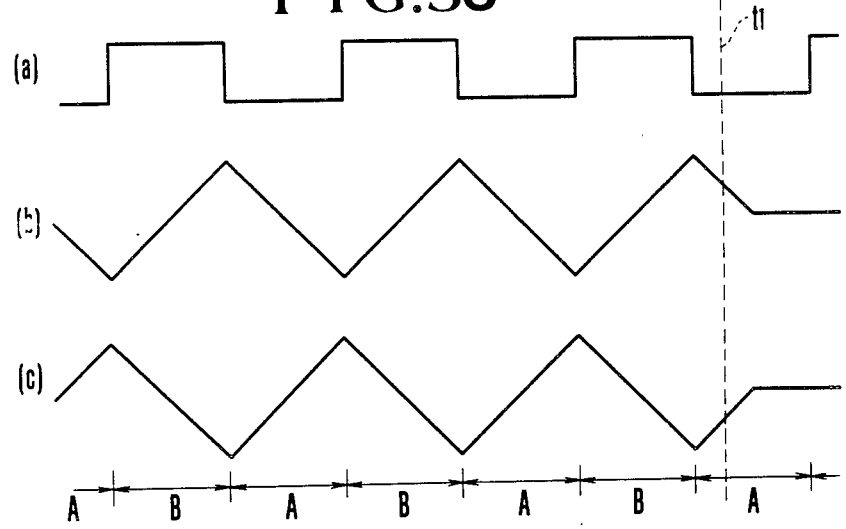
Figure 6:
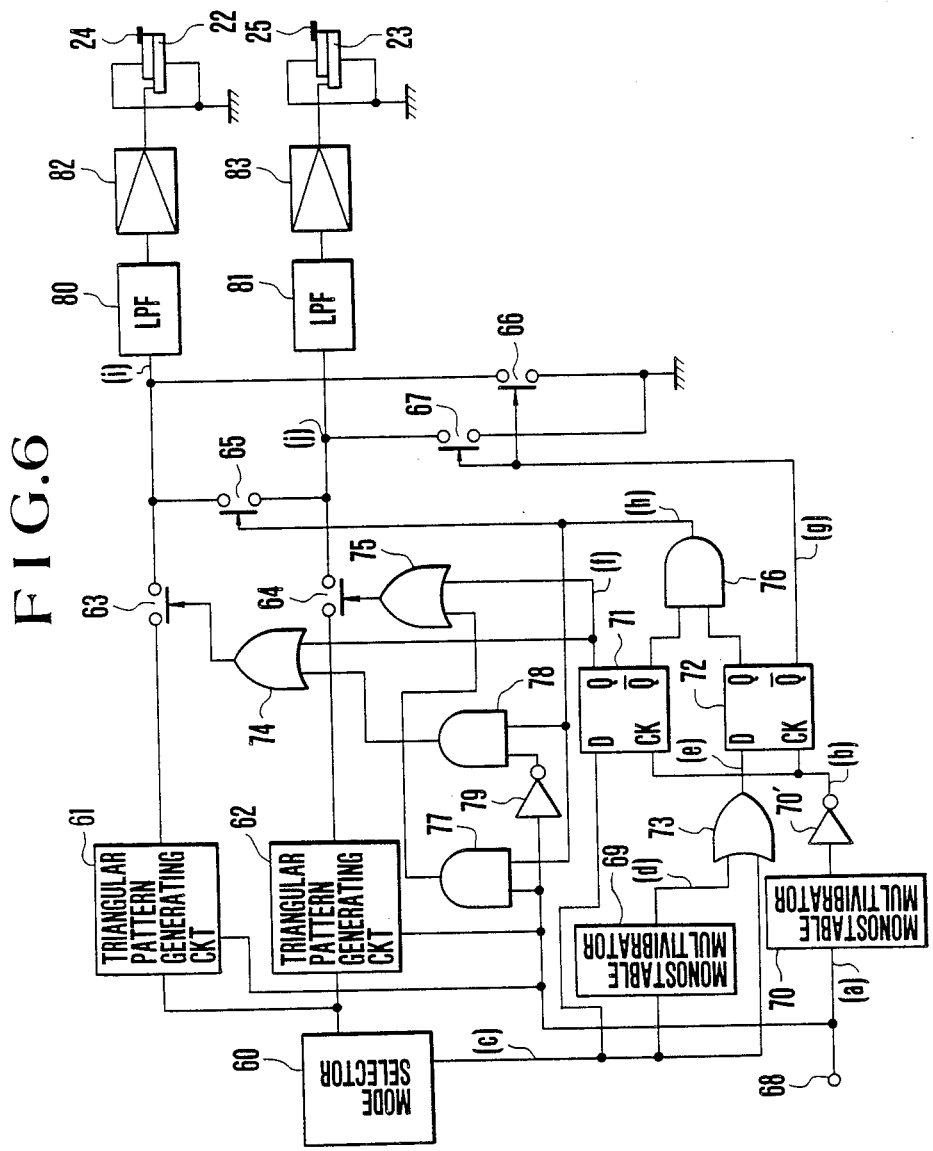
FIG. 6 is a circuit diagram showing the circuit arrangement of a bimorph element control system of a VTR arranged as another embodiment of the invention.
Figure 7:
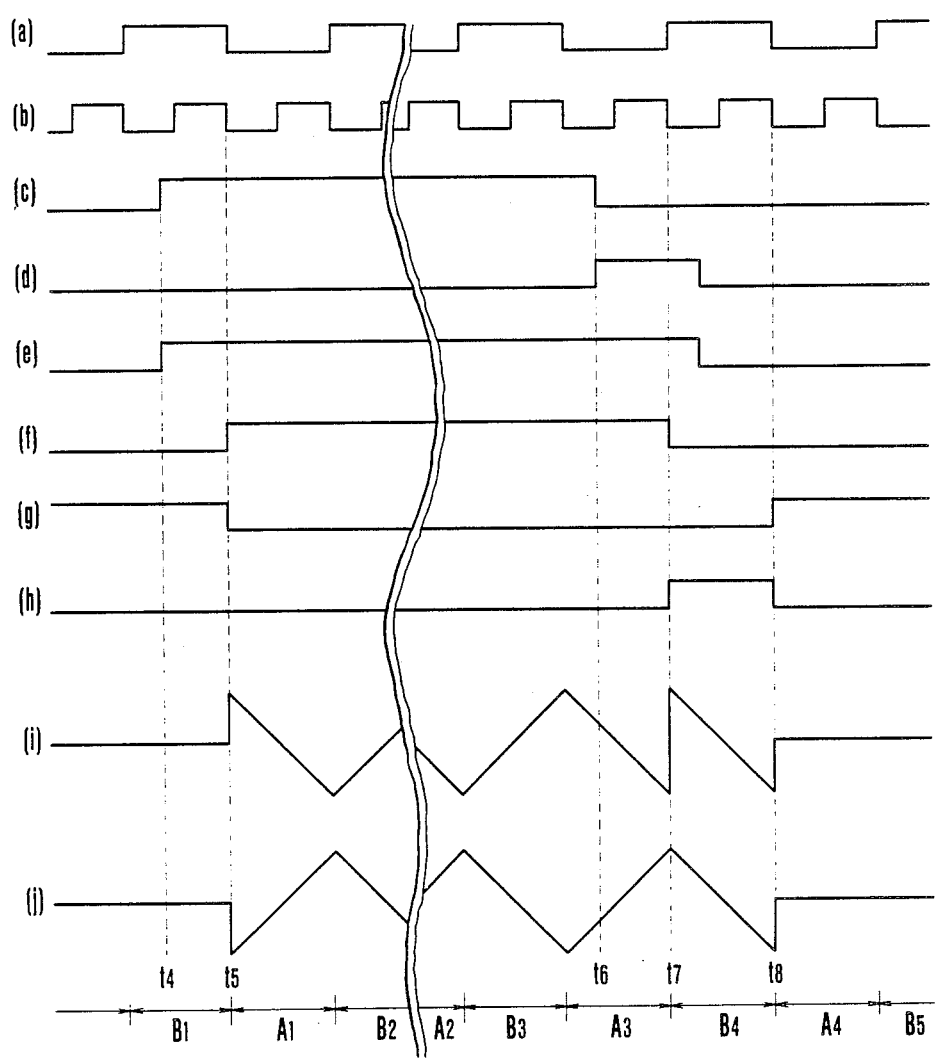
FIG. 7 (a)–(j) is a timing chart showing the output wave forms of various parts of FIG. 6.

FIG. 6 shows the circuit arrangement for a bimorph element control system of a VTR arranged as another embodiment of the invention. FIG. 7 is a timing chart showing the wave forms at points (a)-(j) shown in FIG. 6. Referring to FIG. 6, the embodiment is also provided with bimorph elements 22 and 23 arranged as shown in FIG. 3A; and magnetic heads 24 and 25 arranged as shown in FIG. 3A. The embodiment includes a mode selector 60, which is an operation button or the like; circuits 61 and 62 arranged to generate triangular patterns of impression voltages to be supplied to the bimorph elements 22 and 23 in response to the operation of the mode selector 60; analog switches 63, 64, 65, 66 and 67 respectively arranged to turn on and off according to inputs to their control terminals, as indicated by arrows in the drawing; a terminal 68 arranged to receive a rectangular wave signal of 30 Hz (hereinafter called the 30 PG signal) corresponding to the rotation of the drum 21 shown in FIG. 3A; a monostable multivibrator 69 having a holding time of approximately 1/60 sec; another monostable multivibrator 70, having a holding time of 1/120 sec; arranged to trigger in response to a sudden change of its input for the purpose of forming a rectangular wave signal of 60 Hz in phasic synchronism with the above-stated 30 PG signal; an inverter 70'; D type flip-flops 71 and 72 (hereinafter a flip-flop of this type will be called DFF); OR gates 73, 74 and 75; AND gates 76, 77 and 78; an inverter 79; LPF's 80 and 81; and amplifiers 82 and 83. The embodiment is also provided with recording and reproducing circuits apart from this circuit arrangement.

Where four-times increased speed search reproduction is selected during the normal reproducing operation of the VTR and then the VTR is brought back to normal reproduction, the operation of the VTR is as follows. In FIG. 7, periods An and Bn (wherein "n" represents integers) represent periods during which the heads 24 and 25 are tracing the magnetic tape, respectively. When an instruction for commencement of a high speed search is given to the mode selector 60 at the time t4, the level of the output signal (c) of the mode selector 60 changes from a low level to a high level. At the same time, the levels of the D inputs of the DFF's 71 and 72 also change to high levels. These inputs are then set at the DFF's 71 and 72 at a next set timing point t5. In other words, at the time t5, the Q output (f) of the DFF 71 changes from a low level to a high level to cause the output levels of the OR gates 74 and 75 to become high. Therefore, switches 63 and 64 turn on. Meanwhile, the level of the $\overline{Q}$ output (g) of the other DFF 72 changes from a high level to a low level to cause the switches 66 and 67 to turn off. Accordingly, the potentials at points (i) and (j) change from 0 V to output potentials of the triangular pattern generating circuits 61 and 62. This change enables the high speed searching reproduction to be performed. Further, a tape transport component such as a capstan (not shown) is also controlled at this timing point. As a result, the travelling speed of the tape is increased by four times. Further, during the perios A1, the head 24 is shifted in accordance with the signal at point (i). Meanwhile, since the potential at point (i) suddenly rises at the point in time t5, there is the possibility that ringing of the bimorph element 22 might take place. However, the description is given here on the assumption that a high frequency component can be sufficiently attenuated by means of the LPF 80.

When the instruction for a high speed search is cancelled at mode selector 60 at time t6, the level of the output (c) of the mode selector 60 changes to a low level. The output level of the monostable multivibrator 69, which is arranged to trigger in response to the fall of its input, rises at that time and remains at a high level over a period of 1/60 sec. Accordingly, the level of the D input of the DFF 71 changes to a low level at the time t6. The level of the input of the DFF 72, or the output of the OR gate 73, changes to a low level after the lapse of 1/60 sec from the time t6. Therefore, at a setting time point t7, immediately after the point of time t5, the level of the Q output of the DFF 71 changes to a low level. At a next setting time point t8, the $\bar{Q}$ output of the DFF 72 changes to a high level. Since both the $\bar{Q}$ output of the DFF 71 and the Q output of the DFF 72 are at high levels during a period between the time t7 and t8, the level of the output (h) of the AND gate 76 becomes high. During the period between the times t7 and t8, i.e. during the period B4, head 25 is tracing the tape. Further, the 30 PG signal is at a high level during this period. Therefore, the output level of the AND gate 77 is high during this period while that of the AND gate 78 remains low. If the period between the times t7 and t8 is a period An, the output of the AND gate 77 remains at a low level and the output level of the AND gate 78 becomes high. This causes the switch 65 to be on during this period and only one of the switches 63 and 64 turns on. In other words, the triangular pattern signal supplied to a bimorph element carrying a head in the process of tracing the tape is supplied to both the bimorph elements 22 and 23 during this period. After the time t8, the switches 66 and 67 turn on to bring the potentials at points (i) and (j) back to 0 V. Therefore, the normal reproduction mode is obtained again. The travelling speed of the tape is then brought back to the normal speed by a control system (not shown).

In accordance with the arrangement described above, the changing directions of the voltages impressed on the bimorph elements are the same immediately before switchover to the normal reproducing mode. Therefore, the extents of displacement of the heads are equal to each other after the voltages impressed on the bimorph elements is 0 V. This eliminates difference in the head height to ensure satisfactory normal reproduction. The reason for this has already been described with reference to the embodiment shown in FIG. 4 and thus requires no further description.

In the embodiment shown in FIG. 6, the advantageous effect of the invention is attained by making the directions of displacement of the bimorph elements the same immediately before switch-over from the high speed searching reproduction mode to the normal reproduction mode. However, the unevenness of the relative heights of the two heads can also be prevented by making the displacement directions of the bimorph elements the same in effecting switch-over from one mode where the difference between the voltages impressed on the two bimorph elements is relatively large to another mode where this difference is relatively small, such as in a switch-over from a high speed searching reproduction mode to a still picture reproduction mode, switch-over from a still picture reproduction mode to normal reproduction mode, etc.

Immediately after the switch-over to the normal reproduction mode, the tracking operation of the heads is controlled by controlling the tape transport system such as the capstan, etc. Further, in the above description of the embodiment shown in FIG. 6, the heads mounted on the two bimorph elements are arranged to have the same magnetization direction. Where the heads mounted on the two bimorph elements have different magnetization directions, that is, if they have different azimuth angles, the triangular patterns vary. In that event, however, the same advantageous effect is also attainable by making the displacement directions of the bimorph elements the same immediately before switch-over from one mode where the difference between the voltages impressed on the two bimorph elements is relatively larger to another mode where this difference is relatively small, such as in the case of switch-over from high speed searching reproduction mode to still picture reproduction or normal recording mode.

Figure 8:
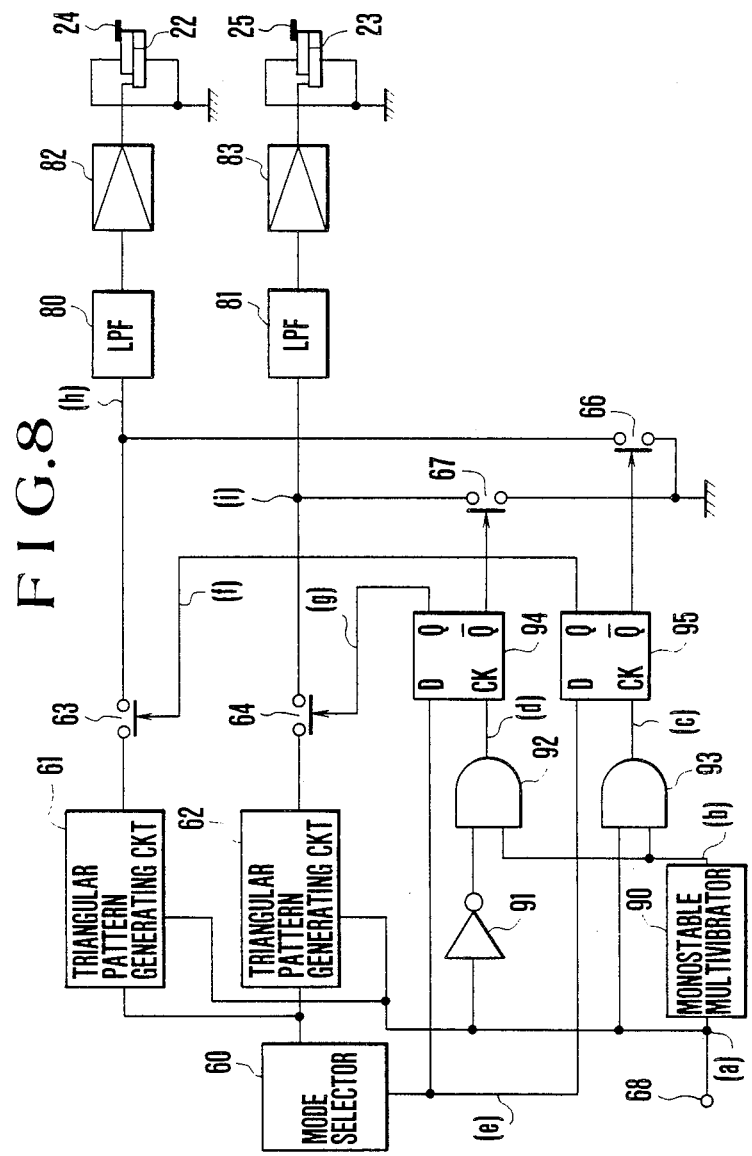
FIG. 8 is a circuit diagram showing the circuit arrangement of a bimorph element control system of a VTR arranged as further embodiment of the invention.
Figure 9:
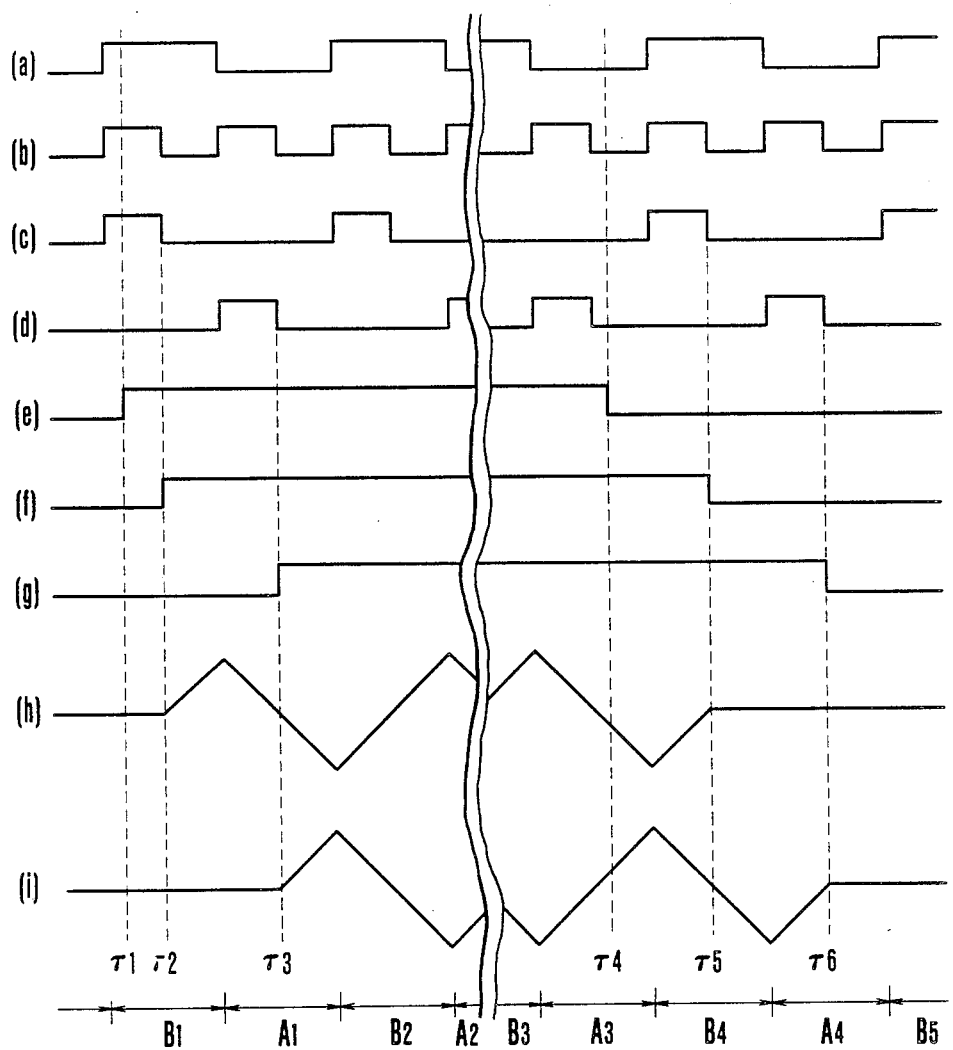
FIG. 9 (a)–(l) is a timing chart showing the output wave forms of various parts of FIG. 8.

FIG. 8 shows the circuit arrangement of a bimorph element control system of a VTR arranged as a further embodiment of this invention. FIG. 9 is a timing chart showing the wave forms at points (a)–(i) indicated in FIG. 8. In FIG. 8, parts similar to those shown in FIG. 6 are indicated by the same reference numerals. This embodiment includes a monostable multivibrator 90 having a holding time of 1/120 sec arranged to form a rectangular wave signal of 60 Hz with its phase locked to the 30 PG signal supplied to the terminal 68 (see point (b) of FIG. 9). The embodiment further includes an inverter 91; AND gates 92 and 93; and DFF's 94 and 95.

During a normal reproducing operation of the VTR, when four-times increased speed searching reproduction is performed and, after that, when the VTR is brought back to the normal reproducting operation, these parts of the VTR operate as follows. When an instruction is given from the mode selector 60 for commencement of the high speed searching reproduction at a point of time $\tau 1$ shown in FIG. 9, the level of the output (e) of the mode selector 60 becomes high. Meanwhile, the AND gates 92 and 93 are arranged to supply the output of the monostable multivibrator 90 to the clock input terminals of the DFF's 94 and 95 when the level of the 30 PG signal is low and high, respectively. The output of the AND gate 93 is represented by point (c) of FIG. 9 and that of the AND gate 92 by point (d) of FIG. 9. The DFF's 94 and 95 produce their Q outputs at high levels at the first setting time points (indicated by points of time $\tau 3$ and $\tau 2$ in FIG. 9) after the level of the output (e) of the mode selector 60 changes to a high level. Accordingly, the switch 63 turns on at the point in time $\tau 2$ and the switch 64 at the point of time $\tau 3$, respectively. Meanwhile, the switch 66 turns off at the point in time $\tau 2$ and the switch 67 at the point in time $\tau 3$, respectively.

If the time $\tau 1$ is at the timing point shown in FIG. 9, the potential of point (h) changes from 0 V to become the output voltage of the triangular pattern signal generating circuit 61 at the point in time $\tau 2$. At this time, since head 24 is not tracing the tape, this switch-over causes no disturbance of the picture. Further, at the point in time $\tau 3$ which is 1/60 sec after this change, the potential of point (i) changes from 0 V to become the output voltage of the triangular pattern signal generating circuit 62, thus delaying as much as the phase difference between the two triangular pattern signals. At that time, the head 25 is also not tracing the tape.

When the high speed searching reproduction mode is cancelled at a time τ4, the levels of the D inputs of the DFF's 94 and 95 become low. Then, the level of the Q output of the DFF 95 becomes low at a time τ5 which is the first setting time point after the time τ4, while that of the Q output of the DFF 94 also become low at another time τ6, which is the first setting time point for the DFF 94 after the point in time τ4. The time difference between these two points in time τ5 and τ6 also corresponds to the phase difference between the two triangular pattern signals. At the time τ5, the level of the $\overline{Q}$ output of the DFF 95 becomes high to turn off the switch 63 and to turn on the switch 66. This fixes the potential of point (h) at 0 V. Further, at the time τ6, the $\overline{Q}$ output of the DFF 94 becomes high and turns the switch 64 off and the switch 67 on, which causes the potential of point (i) to be fixed at 0 V. The heads 24 and 25 are not tracing the magnetic tape at these points of time τ5 and τ6. Therefore, the above-stated change does not bring about any adverse effect on the picture reproduced.

In the arrangement of this embodiment, the displacement directions of the two bimorph elements can also be made the same immediately before switch-over to the normal reproduction mode. Therefore, in the embodiments shown in FIGS. 4 and 6, the displacement extents of the two bimorph elements after the switch-over to the normal reproduction mode are equalized to obviate the possibility of unevenness in the heights of the heads. Further, in this embodiment, in the event of switch-over from the normal reproduction mode to the high speed searching reproduction mode, the high speed searching reproduction mode is obtained under the same condition. Therefore, it is possible to keep the displacement extents of the bimorph elements equalized with a certain phase difference between them during the process of high speed searching reproduction. Further, like the preceding embodiment shown in FIG. 6, this embodiment gives the same advantageous effect in the event of switch-over from the high speed searching reproduction mode to the still picture reproduction or slow motion picture reproduction mode. However, in that event, if the phase difference between the triangular pattern signals in one of the modes to be switched over varies from the phase difference in another mode, the timing for the switch-over must be adjusted according to the phase difference obtained in the mode having a larger voltage difference than the other mode between voltages to be impressed on the two bimorph elements.

Figure 10:
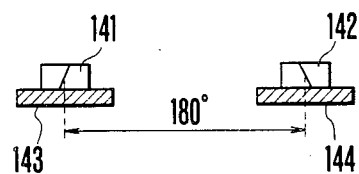
FIG. 10 is an illustration showing the arrangement of heads of a VTR arranged as a still further embodiment of the invention.

FIG. 10 shows the arrangement of the heads of a VTR arranged as a further embodiment of the invention. Referring to FIG. 10, magnetic heads 141 and 142 have different azimuth angles as shown. They are mounted at a phase difference of 180 degrees on a rotary cylinder (not shown). Bimorph elements 143 and 144 are repsectively arranged to carry the magnetic heads.

Figure 11:
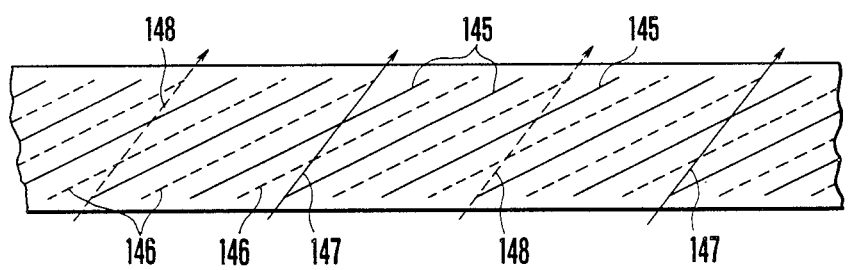
FIG. 11 is an illustration showing the tracing opreation of the heads performed on a tape in the event of high speed searching reproduction by the VTR having the heads thereof arranged as shown in FIG. 10.

With the VTR arranged in this manner, its operation for a varied speed reproduction is as follows. FIG. 11 shows the tracing state of the 141 and 142 heads over the tape during high speed searching reproduction. In FIG. 11, a reference numeral 145 denotes the center lines of recording tracks formed either by the head 141 or by a head having the same azimuth angle as that of head 141. A numeral 146 denotes the center lines of recording tracks formed either by the other head 142 or by a head having the same azimuth angle as that of head 142. A numeral 147 denotes the center lines of the scanning loci of the head 141 obtained during four-times increased speed searching reproduction, which is carried out with the voltage impressed on the bimorph element 143 set at 0 V. A numeral 148 denotes the center lines of the scanning loci of the head 142 obtained with the voltage impressed on the other bimorph element 144 set at 0 V.

Figure 12:
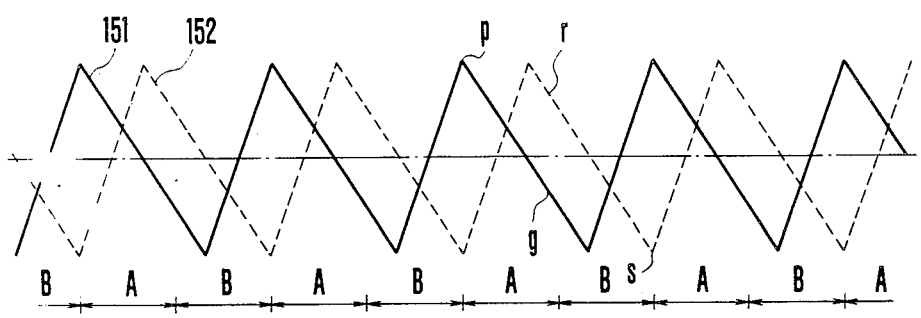
FIG. 12 shows patterns of voltages impressed on bimorph elements at the time of four times increased speed searching reproduction.

FIG. 12 shows voltage pattern signals to be impressed on the bimorph elements 143 and 144 during times increased speed searching reproduction. In FIG. 12, numeral 151 denotes the voltage pattern signal impressed on the bimorph element 143; and 152 the voltage pattern signal impressed on the other bimorph element 144. A reference symbol A denotes periods during which head 141 produces a reproduced signal;and B denotes periods during which head 142 produces a reproduced signal. The portions of these impressed voltage pattern signals actually required are portions from a point p to a point g and from a point r to a point s. However, the arrangement to impress the FIG. 12 voltage patterns makes the DC components of the impressed voltages zero and thus serves to prevent the secular change of the bimorph elements 143 and 144. Further, this permits application of the invention as will now be described.

Figure 13:
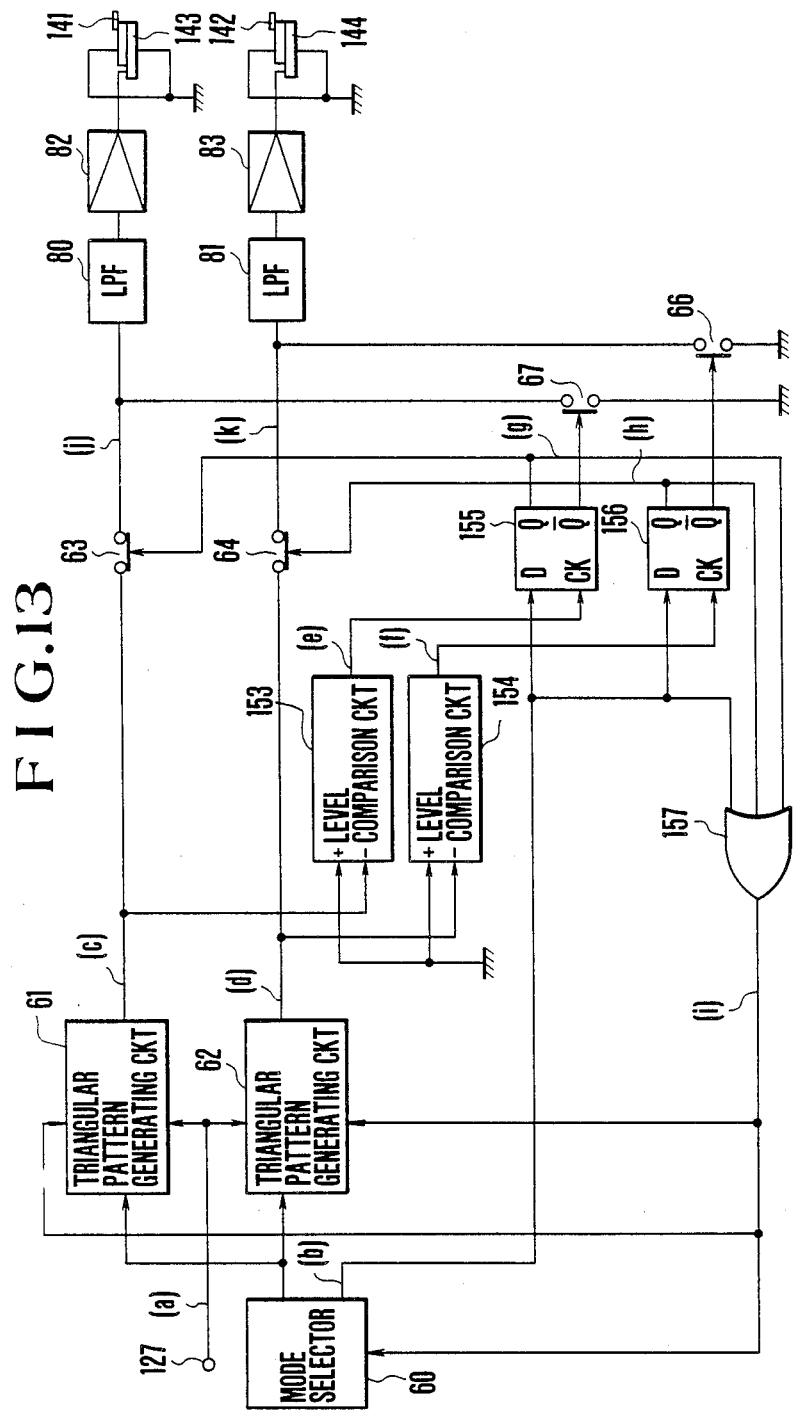
FIG. 13 is a circuit diagram showing the circuit arrangement of a bimorph element control system employed in a VTR having a head arrangement correspoinding to the arrangement shown in FIG. 10 as another embodiment of the invention.

FIG. 13 shows the circuit arrangement of a bimorph element control system of a VTR employing the head arrangement of FIG. 10 as another embodiment of the invention. In FIG. 13, parts similar to those shown in FIG. 8 are indicated by the same reference numerals. The embodiment includes level comparison circuits 153 and 154; DFF's 155 and 156; and a 3-input OR gate 157.

Figure 14:
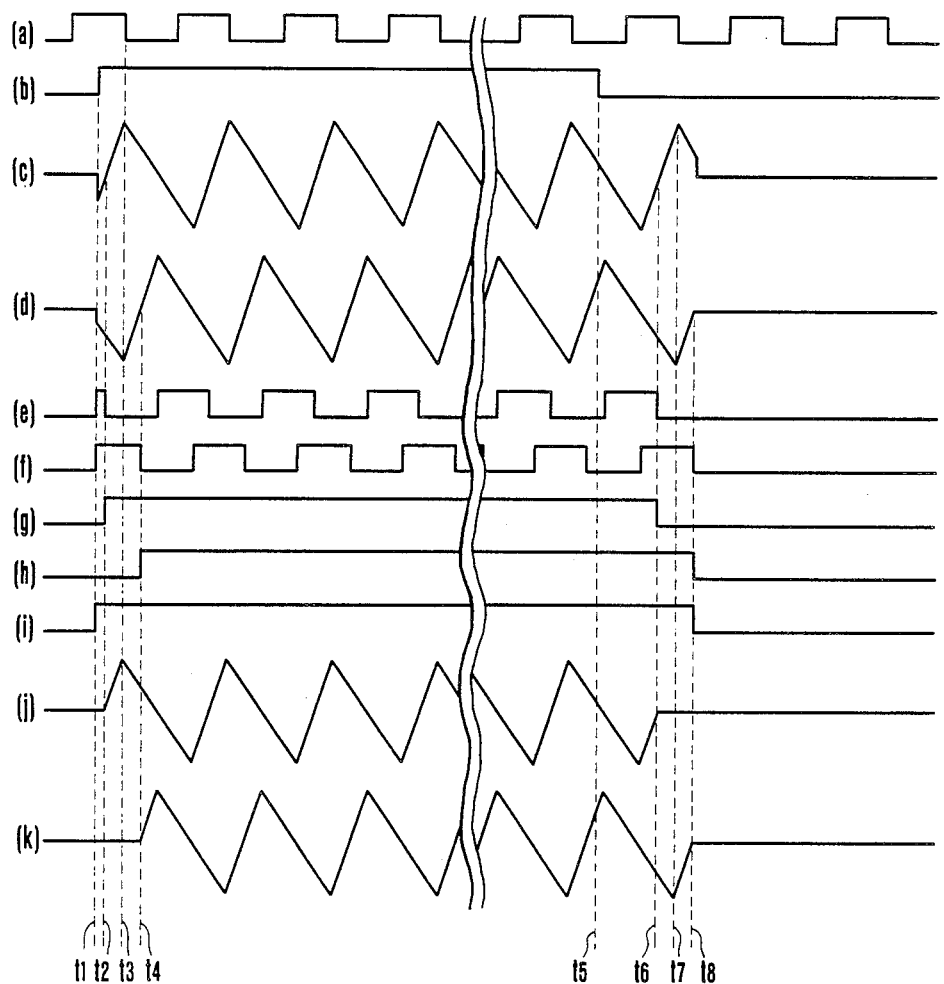
FIG. 14 (a)–(k) is a timing chart showing the output wave forms of various parts of FIG. 13.

During a normal reproducing operation of this VTR, when four-times increased speed searching reproduction is performed and, after that, when the VTR is brought back to the normal reproducing operation, the various parts of the VTR operate as follows: FIG. 14 is a timing chart showing the wave forms at points (a)–(k) of FIG. 13.

When an instruction is given from the mode selector 60 for a high speed searching reproduction mode at a time t1 shown in FIG. 14, the level of the output (b) of the mode selector 60 changes to a high level. At this instant t1, the triangular pattern signal generating circuits 61 and 62 begin to produce their outputs as shown by wave forms 151 and 152 in FIG. 12. The level comparison circuits 153 and 154 compare the output voltages of the triangular pattern signal generating circuits 61 and 62 with a zero level. When the output voltages of the triangular pattern signal generating circuits 61 and 62 become smaller than 0 V, the level comparison circuits 153 and 154 produce high level outputs. The DFF's 155 and 156 are arranged to sample their D inputs when the output voltages of the triangular pattern signal generating circuits 61 and 62 change from negative to positive. Then, at the time t2 shown in FIG. 14, the Q output (g) of the DFF 155 changes to a high level and its $\overline{Q}$ output to a low level. At this instant, therefore, the switch 63 turns on and the switch 67 turns off. Then, a triangular pattern voltage begins to be supplied to the bimorph element 143 via the LPF 80 and the amplifier 82. At that time, since the head 141 is not tracing the tape, the picture remains undisturbed by this switch-over. After that, the tape travel speed changes the instant head 141 next begins to trace the tape (at a point in time t3 shown in FIG. 14). Such being the arrangement of the embodiment, the timing for switchover of the tape travel speed coincides perfectly with the timing for switch-over to drive the bimorph element with the triangular pattern signal.

Next, the output level of the DFF 156 changes the instant the output of the triangular pattern signal generating circuit 62 exceeds 0 V (at a point in time t4 shown in FIG. 14). At that instant, the output voltage of the triangular pattern also begins to be suppplied to the bimorph element 142. At that time, the head 144 is not tracing the tape, so that the picture is not disturbed.

With the heads arranged as shown in FIG. 10, the normal reprduction mode can still be switched over to the high speed searching reproduction mode without causing unevenness in the relative heights of the heads since the shifting state of one head can be equalized to that of the other with a certain phase difference kept between them. This ensures satisfactory high speed searching reproduction.

When the high speed searching reproduction mode is cancelled and an instruction is given for the normal reproduction mode by the mode selector 60 at a next time t5, the levels of the D inputs of the DFF's 155 and 156 both become low. Then, at the time of next sampling by the DFF 155 (or a time t6 shown in FIG. 14), the level of the Q output of the DFF 155 becomes low to terminate the supply of the triangular pattern signal to the bimorph element 143 for the high speed searching reproduction. At that time, the head 142 is tracing the tape. However, upon completion of this tracing process, a servo circuit (not shown) brings the tape travel speed back to the normal tape speed (at a time t7 of FIG. 14).

Immediately after the time t7, the head 141 performs tracing for normal reproduction. At a next time for sampling by the DFF 156 (a time t8 shown in FIG. 14), the supply of the triangular pattern voltage to the bimorph element 144 stops. Further, at the time t8, the levels of both the outputs (g) and (h) of the DFF's 155 and 156 become low. This causes the level of the output (i) of the OR gate 157 to become low to stop the triangular pattern signal generating circuits 61 and 62 from generating the triangular signals.

As apparent from the foregoing description, the head arrangement of a VTR as shown in FIG. 10 also enables the VTR to have the same patterns of displacement of the bimorph elements. Therefore, the head heights can be kept even for normal reproduction. In the event of high speed searching reproduction, the change in head height and the average heights of the heads can be equalized for satisfactory reproduction.

This invention is also applicable to a VTR having the heads arranged in a different manner from the head arrangement shown in the two preceding embodiments. For example, this invention is applicable to a VTR where, in recording, adjacent recording tracks are formed one after another by two heads having different azimuth angles. In reproduction, two heads having the same azimuth angle as that of either one of the recording heads are used. With these heads mounted on bimorph elements the recording tracks formed by one of the recording heads are traced alone for special reproduction. In that case, the triangular pattern signals to be impressed on the two bimorph elements are arranged to be the same or similar to each other and the triangular pattern signals are switched over from one to the other according to the phase difference between them.

Further, in the foregoing description of embodiments, switch-over between the high speed searching reproduction mode and the normal reproduction mode is described. However, in accordance with the invention, the same advantageous effect is also attainable for switch-over between high speed searching reproduction mode and slow motion reproduction mode or between slow motion reproduction mode and normal reproduction mode. In those instances, the heights of the heads are equalized by equalizing the impressed conditions of the triangular pattern signals for normal reproduction before or after the switch-over; and the displacement patterns of the bimorph elements can be equalized for varied speed reproduction. In the event of switch-over between the high speed searching reproduction mode and the slow motion reproduction mode, the phase difference obtained between the triangular pattern signals to be impressed on the two bimorph elements in one of the modes ofter varies in the other mode. In such a case, a predetermined voltage (such as 0 V) is impressed on either of the bimorph elements for a predetermined period of time according to the degree of such difference variation.

What is claimed is:

1. An information signal recording and/or reproducing apparatus for recording and/or reproducing the information signal on and/or from tracks on a recording medium; comprising:
   (a) a pair of heads to trace the recording medium;
   (b) a pair of shifting means for shifting said pair of heads, said heads being respectively mounted on said pair of shifting means;
   (c) first driving means to generate first and second driving signals for driving said pair of respective shifting means, said first and second driving signals being respectively a signal for tracing said pair of heads along the tracks when the apparatus is in a first recording and/or reproducing mode;
   (d) second driving means to generate third and fourth driving signals for driving said pair of shifting means respectively, said third and fourth driving signals being signals for tracing said pair of heads along the tracks when the apparatus is in a second recording and/or reproducing mode, a maximum value of level difference between the third and fourth driving signals obtained at the same time being smaller than a maximum value of level difference between the first and second driving signals obtained at the same time;
   (e) mode selection means for switching between said first and second recording and/or reproducing modes; and
   (f) driving control means for driving said pair of shifting means by selectively using said first, second, third and fourth driving signals to the same extent in the same direction in response to said mode selection means switching from the first mode to the second mode.

2. An apparatus according to claim 1, wherein said first and second driving signals are respectively arranged to be at predetermined levels; and said third and fourth driving signals are kept at the same predetermined level.

3. An apparatus according to claim 2, wherein the level of said third driving signal is between the levels of said first and second driving signals.

4. An apparatus according to claim 3, wherein said driving control means includes a circuit to replace said first driving signal with said second driving signal.

5. An apparatus according to claim 1, wherein said first and second driving signals are respectively arranged to continuously vary between first and second levels.

6. An apparatus according to claim 5, wherein said third and fourth driving signals are arranged to be at the same predetermined level.

7. An apparatus according to claim 6, wherein said third driving signal is at a level between said first and second levels.

8. An apparatus according to claim 7, wherein said driving control means includes a circuit for replacing said first driving signal with said second driving signal.

9. An apparatus according to claim 5, wherein said first and second driving signals have the same wave form and differ in phase.

10. An apparatus according to claim 9, wherein said driving control means includes a circuit arranged to shift timing of switch-over between the first driving signal and the third driving signal and timing of switch-over between the second and fourth driving signals according to a phase difference between said first and second driving signals.

11. An apparatus according to claim 10, wherein said third and fourth driving signals are at the same predetermined level.

12. An information signal recording and/or reproducing apparatus for recording and/or reproducing the information signal on and/or from tracks on a recording medium; comprising:
 (a) a pair of heads to trace the recording medium;
 (b) a pair of electric-to-mechanical conversion elements respectively having said pair of heads mounted thereon and arranged to shift the positions of said heads, said elements each having a residual displacement characteristic;
 (c) first driving means to generate a first and second driving signals for driving said pair of conversion elements, said first and second driving signals being respectively a signal for tracing said pair of heads along the tracks when the apparatus in a first recording and/or reproducing mode;
 (d) second driving means for driving said pair of conversion elements so as to cause said pair of heads to trace along the tracks when the apparatus is in a second recording and/or reproducing mode;
 (e) mode selection means for switching between said first and second recording and/or reproducing modes; and
 (f) driving control means for driving said pair of conversion elements by using said first and second driving signals to equalize the extents of displacement of said pair of conversion elements according to the residual displacement characteristic in response to the switching of said mode selection means from said first recording and/or reproducing mode to said second recording and/or reproducing mode.

13. An apparatus according to claim 12, wherein said driving control means includes a circuit for replacing the first driving signal with the second driving signal.

14. An apparatus according to claim 12, wherein said first and second driving signals have the same signal waveform and exhibit a phase difference; and
 said driving control means includes a circuit for shifting a timing for stopping the supply of the first driving signal to one of the conversion elements and a timing for stopping the supply of the second driving signal to the other conversion element according to said phase difference between the first and second driving signals.

15. A tape recorder; comprising:
 (a) a pair of rotating heads having a common rotating axis and differing 180 degrees in phase from each other;
 (b) a pair of shifting means for respectively shifting said pair of rotating heads in directions crossing the rotation planes of the heads;
 (c) moving means for moving a tape shaped recording medium;
 (d) mode selection means for switching the recorder between a first mode in which said moving means moves the medium at a first speed and a second mode in which said moving means moves the medium at a second speed faster than said first speed;
 (e) means for respectively driving said pair of shifting means with a first pattern signal and a second pattern signal according to the first speed when the recorder is in said first mode;
 (f) means for respectively driving said pair of shifting means with a third pattern signal and a fourth pattern signal according to the second speed when the recorder is in said second mode; and
 (g) driving control means for controlling both of said pair of shifting means by using one of said first, second, third, and fourth pattern signals in a perdetermined period in response to the operation of said mode selection means.

16. A tape recorder; comprising:
 (a) a pair of rotating heads having a common rotating axis and differing 180 degrees in phase from each other;
 (b) a pair of shifting means for respectively shifting said pair of rotating heads in directions crossing the rotation planes of the heads;
 (c) moving means for moving a tape shaped recording medium;
 (d) mode selection means for switching the recorder between a first mode in which said moving means moves the medium at a first speed and a second mode in which said moving moves the medium at a second speed faster than said first speed;
 (e) generation means for generating first and second pattern signals according to the first speed and third and fourth pattern signals according to the second speed;
 (f) driving means for driving said pair of shifting means based on pattern signals generated by said generation means; and
 (g) determining means for determining a timing point for changing the generation between said first and third pattern signals and a timing point for changing the generation between said second and fourth pattern signals according to the operation of said mode selection means, said determining means being arranged to shift said timing points to a degree corresponding to a phase difference between said first and second pattern signals.

* * * * *